(12) United States Patent
Yang et al.

(10) Patent No.: US 11,801,475 B2
(45) Date of Patent: Oct. 31, 2023

(54) SYSTEM AND METHOD FOR MICROALGAE CARBON FIXATION REGULATED BASED ON NATURAL ENVIRONMENTAL CHANGES

(71) Applicant: Beijing University of Aeronautics and Astronautics, Haidian District Beijing (CN)

(72) Inventors: Xiaoyi Yang, Haidian District Beijing (CN); Ziyu Liu, Haidian District Beijing (CN); Shujun Han, Haidian District Beijing (CN)

(73) Assignee: Beijing University of Aeronautics and Astronautics, Haidian District Beijing (CN)

( * ) Notice: Subject to any disclaimer, the term of this patent is extended or adjusted under 35 U.S.C. 154(b) by 241 days.

(21) Appl. No.: 17/602,991

(22) PCT Filed: Feb. 3, 2021

(86) PCT No.: PCT/CN2021/075103
§ 371 (c)(1),
(2) Date: Oct. 11, 2021

(87) PCT Pub. No.: WO2021/196882
PCT Pub. Date: Oct. 7, 2021

(65) Prior Publication Data
US 2022/0111333 A1     Apr. 14, 2022

(30) Foreign Application Priority Data
Apr. 3, 2020   (CN) .......................... 202010260276.9

(51) Int. Cl.
*B01D 53/62*     (2006.01)
*B01D 53/84*     (2006.01)

(52) U.S. Cl.
CPC ............. *B01D 53/62* (2013.01); *B01D 53/84* (2013.01); *B01D 2257/504* (2013.01); *B01D 2258/0283* (2013.01)

(58) Field of Classification Search
CPC .. B01D 53/62; B01D 53/84; B01D 2257/504; B01D 2258/0283
(Continued)

(56) References Cited

U.S. PATENT DOCUMENTS

2012/0174477 A1* 7/2012 Kleinwaechter ....... A01G 9/243
                                                                    47/17
2019/0176086 A1* 6/2019 Monroy Samperi .. C12M 41/12

FOREIGN PATENT DOCUMENTS

ES           2451579 A1 *  3/2014  ............ C12M 21/02

OTHER PUBLICATIONS

ES-2451579-A1 English translation (Year: 2014).*

* cited by examiner

*Primary Examiner* — Anita Nassiri-Motlagh
(74) *Attorney, Agent, or Firm* — K&L Gates LLP; Louis C. Cullman; Giorgios N. Kefallinos

(57) ABSTRACT

The present invention provides a system for microalgae carbon fixation regulated based on natural environmental changes, which includes the following units: a microalgae cultivation unit; a light condensing unit configured to receive sunlight and increase light power density, the light condensing unit including one or more angle-adjustable light-condensing reflective panels; a light splitting unit configured to receive and split light transmitted from the light condensing unit, the light splitting unit including one or more angle-adjustable light splitting panels, the light splitting panel being capable of transmitting light within a spectral band in which microalgae has highest photosynthetic efficiency to thus allow the light to irradiate the (Continued)

microalgae cultivation unit, while being capable of reflecting light within other spectral bands; and a thermosiphon temperature control unit configured to control a temperature of the microalgae cultivation unit by controlling an opening degree of an air regulating valve above the microalgae cultivation unit.

11 Claims, 1 Drawing Sheet

(58) Field of Classification Search
USPC .......................................................... 423/220
See application file for complete search history.

SYSTEM AND METHOD FOR MICROALGAE CARBON FIXATION REGULATED BASED ON NATURAL ENVIRONMENTAL CHANGES

CROSS REFERENCE TO RELATED APPLICATIONS

This application is a national phase of PCT/CN2021/075103 filed on Feb. 3, 2021 which claims priority to Chinese Application CN202010260276.9 filed on Mar. 4, 2020, the entire disclosures of which are incorporated by reference herein.

FIELD OF THE INVENTION

The present invention relates to a system and a method for microalgae carbon fixation regulated based on natural environmental changes, and in particular to a light condensing and splitting system for microalgae carbon fixation based on irradiance and temperature and a method thereof. The present invention belongs to the field of combined utilization of solar energy and biological energy. In particular, the present invention relates to a method for promoting efficient fixation of $CO_2$ in flue gas by microalgae based on a light condensing and splitting technology.

BACKGROUND OF THE INVENTION

Analysis of global warming factors shows that $CO_2$ in the flue gas emitted from coal-fired power plants and chemical processing of coal contributes to more than 50% of the impact on climate change. This is also true in China where post-combustion emissions are the main source of emissions. With the development of coal chemical industry and industry, emissions are still increasing year by year. Therefore, $CO_2$ capture, transportation, storage and utilization have become key technologies to solve climate change at the current stage.

The energy consumption of $CO_2$ capture and purification increases exponentially with the initial concentration, and the concentration of captured and purified $CO_2$ is not only limited by the transportation distance but also limited by the way of storage and use. In particular, long-distance transportation requires that the purity of single-phase $CO_2$ be greater than or equal to 95%, which makes it hardly possible to realize long-distance utilization of low-concentration 12%-15% $CO_2$ contained in coal-fired flue gas. The utilization of low-concentration $CO_2$ has thus become a key issue to be urgently solved in CCUS (Carbon Capture, Utilization and Storage) technology.

Microalgae carbon fixation shows its unique advantages in CCUS technology because it is applicable to a wide range of $CO_2$ concentrations and capable of achieving short-distance carbon fixation. However, short-distance utilization requires that microalgae should adapt to the local solar radiation and seasonal changes in temperature. The suitable temperature range for microalgae is 15-25° C., and the spectral bands over which microalgae has the highest photosynthetic efficiency are blue light (440-460 nm) and red light (640-660 nm). 50% of the radiant energy of near-infrared light (700-2500 nm) in solar energy contributes only a little to photosynthetic efficiency, and it is mainly released in the form of heat energy.

High photosynthetic efficiency of microalgae means a high growth rate and high carbon fixation efficiency of microalgae. The main problem with large-scale cultivation of microalgae in natural environments is that the irradiance and the temperature are high in summer but low in winter, and therefore natural environments cannot satisfy the requirement that the growth conditions of microalgae should be kept within suitable irradiance and temperature ranges. Furthermore, light shading limits the maximum cultivation concentration of microalgae and the depth of microalgae cultivation pools, which decreases the utilization efficiency of cultivation pools.

At present, the existing technologies have not yet involved the technology of coupled and combined use of sunlight condensing and splitting and temperature control, nor have they involved any research and reports on how to couple light energy with temperatures in the natural environments to increase the yield of microalgae.

SUMMARY OF THE INVENTION

In order to solve the above described problems in the existing technologies, the present invention provides a method for promoting microalgae carbon fixation through combined regulation of irradiance and temperature based on natural environmental conditions.

The present invention, based on the demands for spectra and temperature during the growth of microalgae, proposes a technique of coupling light condensing and light splitting with thermosyphon. Incident sunlight is condensed, and then split in accordance with the absorption characteristics of microalgae, by way of which and combined with the ability of spirulina to withstand relatively a high shearing effect, efficient growth and microalgae carbon fixation, as well as efficient use of solar energy spectrum by grading, are realized.

An objective of the present invention is to provide a system for microalgae carbon fixation regulated based on natural environmental changes. The system includes the following units:
  a microalgae cultivation unit;
  a light condensing unit configured to receive sunlight and increase light power density, the light condensing unit including one or more angle-adjustable light-condensing reflective panels;
  a light splitting unit configured to receive and split light transmitted from the light condensing unit, the light splitting unit including one or more angle-adjustable light splitting panels and connected by a connecting panel, the light splitting panel being capable of transmitting light within a spectral band in which microalgae has highest photosynthetic efficiency to thus allow the light to irradiate the microalgae cultivation unit, while being capable of reflecting light within other spectral bands; and
  a thermosiphon temperature control unit configured to control a temperature of the microalgae cultivation unit by controlling an opening degree of an air regulating valve above the microalgae cultivation unit.

Specifically, the multiple light splitting panels of the light splitting unit provided in the microalgae cultivation unit of the present invention are connected to each other by the connecting panel. The connecting panel between the light splitting panels may be opened as needed to form a gap between the light splitting panels.

In the present invention, the temperature of the microalgae cultivation unit may be controlled by jointly controlling the opening degree of the air regulating valve above the microalgae cultivation unit and the connecting panel between the light splitting panels.

For example, in a preferred embodiment of the present invention, when the temperature is lower than 15° C., the connecting panel is opened and the air regulating valve is closed; and heated hot air returns to the microalgae cultivation unit for heating the air. When the temperature is higher than 15° C., the connecting panel is closed and the air regulating valve is opened; and heated hot air is output, and the output is controlled by the opening degree of the air regulating valve.

For example, in an example of practical use of the present invention, light condensing panels are provided on a light receiving surface of an outdoor roof in east and west directions respectively, and light irradiating the light-condensing reflective panels is reflected to the light splitting panel. The light-condensing reflective panel may be used to track the sunlight automatically or manually so as to adjust a light condensing ratio.

In a preferred embodiment of the present invention, the light-condensing reflective panel has a reflectance of 55%-90%.

In a preferred embodiment of the present invention, the light-condensing reflective panel automatically tracks the sunlight and is capable of reflecting the sunlight to a light-transmitting film and focusing the sunlight onto a surface of the light splitting panel. The light-condensing reflective panel is made of an aluminum plate with a thickness of 0.3-0.5 mm. An angle between the incident light and the light-condensing reflective panel is in the range of 0°-90°, preferably 45°. Preferably, a length ratio of the light-condensing reflective panel to the microalgae pool is 1:1, and a width ratio of the light-condensing reflective panel to the microalgae pool is 1:1.

In a preferred embodiment of the present invention, when the temperature of the microalgae cultivation unit is lower than 15° C., the air regulating valve is closed; and when the temperature of the microalgae cultivation unit is higher than 25° C., the air regulating valve is opened, and output high-temperature hot air is used for dehydration and drying of a microalgae pulp in a downstream unit.

In a preferred embodiment of the present invention, the light splitting panel is configured as such that the light splitting panel is capable of splitting an incident light source into visible light within 300-700 nm and infrared light within 700-2500 nm.

In a preferred embodiment of the present invention, light within a spectral band in which the microalgae has the highest photosynthetic efficiency is light in the range of 200-700 nm.

In a preferred embodiment of the present invention, the light splitting panel is configured as such that the light splitting panel is capable of controlling a transmittance of light within a wavelength of 300-700 nm to be within a range of 0.85-1, and controlling a reflectance of light with a wavelength of 700-2500 nm to be within a range of 0.5-1.

In a preferred embodiment of the present invention, the light splitting panel is a glass light splitting panel or a light splitting panel with a light splitting film attached thereon.

In one embodiment of the present invention, a substrate of the light splitting panel with the light splitting film attached thereon is a Si substrate, and a material of the light splitting film is a multilayer film material containing $SiO_2$ and $TiO_2$.

In a preferred embodiment of the present invention, the wavelength of the blue light is selected from the range of 440-460 nm and the wavelength of the red light is selected from the range of 640-660 nm.

In a preferred embodiment of the present invention, the present invention further provides a method for using the system for microalgae carbon fixation regulated based on natural environmental changes. The method includes:

1) placing microalgae to be cultivated into the microalgae cultivation unit;
2) adjusting the light-condensing reflective panel of the light condensing unit such that light is received and condensed by the light-condensing reflective panel and then irradiates the light splitting panel; receiving the light from the light-condensing reflective panel by the light splitting panel, and then splitting the received light by the light splitting panel to obtain visible light within 300-700 nm and infrared light within 700-2500 nm; and enabling the visible light within 300-700 nm to be transmitted through the light splitting panel and irradiate the microalgae cultivation unit, and enabling the infrared light within 700-2500 nm to be reflected back; and
3) adjusting the thermosiphon temperature control unit, so that when the temperature of the microalgae cultivation unit is lower than 15° C., the hot air regulating valve is closed, and when the temperature of the microalgae cultivation unit is higher than 25° C., the hot air regulating valve is opened.

In a preferred embodiment of the present invention, the thermosiphon temperature control unit is adjusted as such that, when the temperature of the microalgae cultivation unit is lower than 15° C., the thermosiphon temperature control unit closes the air regulating valve and opens the connecting panel between the light splitting panels, in which case the greenhouse effect in the microalgae cultivation unit is enhanced due to the light condensing. In this way, the temperature of this part of air is increased, and hot air flows upward, and thermosiphon causes flowing of the hot air and cold air as well as heat exchange therebtweeen, by means of which the temperature of the microalgae cultivation unit is increased. The thermosiphon temperature control unit is also configured as such that, when the temperature of the microalgae cultivation unit is higher than 25° C., the thermosiphon temperature control unit closes the connecting panel between the light splitting panels and opens the hot air regulating valve, so that heated hot air is output to thus decrease the temperature of the microalgae cultivation unit, and this part of hot air may be used as a heat source for drying the microalgae.

The solar energy condensing and splitting system also includes a thermosyphon temperature control system, which adjusts an output of hot air depending on the temperature.

The present invention brings the following beneficial effects.

1. The present invention uses spectral decomposition technology to guide light of different wavelengths in the solar spectrum to meet corresponding spectral demands and temperature demands. The light condensing ratio is adjusted depending on the photosynthetic needs of microalgae, so that the demands for wavebands and intensity of light by photosynthesis can be met to the maximum extent.

2. The present invention uses a natural light source to provide light energy for the growth and reproduction of microalgae, with temperature, light intensity and wavebands being controllable. This can realize the effective coupling of industrial production of microalgae with renewable energy. The use of the device to cultivate microalgae can increase the number of days of operation of the device in winter in northern China and reduce the amount of required cooling water in hot summer days.

3. The greenhouse effect enhanced by the thermosiphon temperature control system helps to obtain hot air in hot seasons, providing a heat source for the drying of microalgae, and reduces energy consumption during the drying.

4. The system for microalgae carbon fixation of the present invention can increase the cultivation depth of the microalgae pool by 5%-10%, thereby increasing the concentration of harvested microalgae by 8%-15% and the yield of the microalgae by 1.3-1.8 times. Low energy consumption, low cost, high growth rate and high carbon sequestration efficiency are thus realized.

DETAILED DESCRIPTION OF THE EMBODIMENTS

The present invention will be described in detail below in conjunction with embodiments, but the scope of the present invention is not limited to the following embodiments.

Example 1 Method for Carbon Fixation by Spirulina Suitable for Use in High-Irradiance and High-Temperature Natural Environmental Conditions A light reflective film with a reflectance of 80%-90% was attached to a surface of a light-condensing reflective panel. An angle between incident sunlight and the light-condensing panel (i.e., the light-condensing reflective panel) was 35°-45°. A length ratio of the light-condensing panel to a microalgae pool was 1:1, and a width ratio of the light-condensing panel to the microalgae pool was 1:1.

Light splitting panels each adopted a light splitting film made of a glass substrate and a silicon substrate, which was a light splitting film with 30-35 layers of $SiO_2/TiO_2$, with a transmittance of 0.85 for visible light within 300-700 nm, and a reflectivity greater or equal to 0.65 for infrared light within 700-2500 nm.

Figure 2:
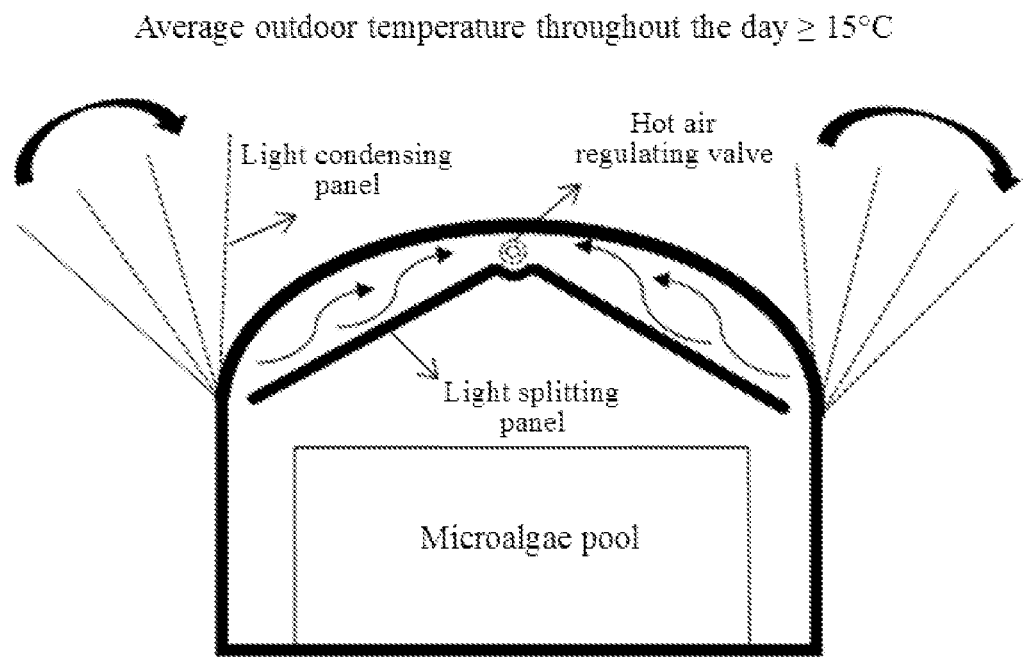
FIG. 2 shows another embodiment of the system for microalgae carbon fixation regulated based on natural environmental changes of the present invention, and shows a working status of the system at a temperature of 25-38° C.

At a temperature higher than 25° C., a connecting panel between the light splitting panels was closed, and heated hot air flowed out, as shown in FIG. 2. This part of hot air provided a heat source for drying of microalgae. A hot air regulating valve was fully opened, and all hot air was discharged for drying of microalgae powder.

In a high-temperature season, at a temperature of 25-38° C. and an irradiance of 1000-1400 $MJ/m^2$, the growth rate of spirulina was increased by 1.3 times under the combined action of light condensing and splitting and siphonage.

Example 2 Method for Carbon Fixation by Spirulina Suitable for Use in Low-Irradiance and Low-Temperature Natural Environmental Conditions A light reflective film with a reflectance of 90% was attached to a surface of a light-condensing reflective panel. An angle between incident sunlight and the light-condensing panel (i.e., the light-condensing reflective panel) was 45°. A length ratio of the light-condensing panel to a microalgae pool was 1:1, and a width ratio of the light-condensing panel to the microalgae pool was 1.2:1. Light splitting panels each adopted a light splitting film made of a glass substrate and a silicon substrate, which was a light splitting film with 25-30 layers of $SiO_2/TiO_2$, with a transmittance of 0.9 for visible light within 300-700 nm, and a reflectivity greater or equal to 0.5 for infrared light within 700-2500 nm. A hot air regulating valve was fully closed, and a connecting panel between the light splitting panels was opened. All hot air was used to circulate in the pool to increase the temperature of the microalgae cultivation pool.

Figure 1:
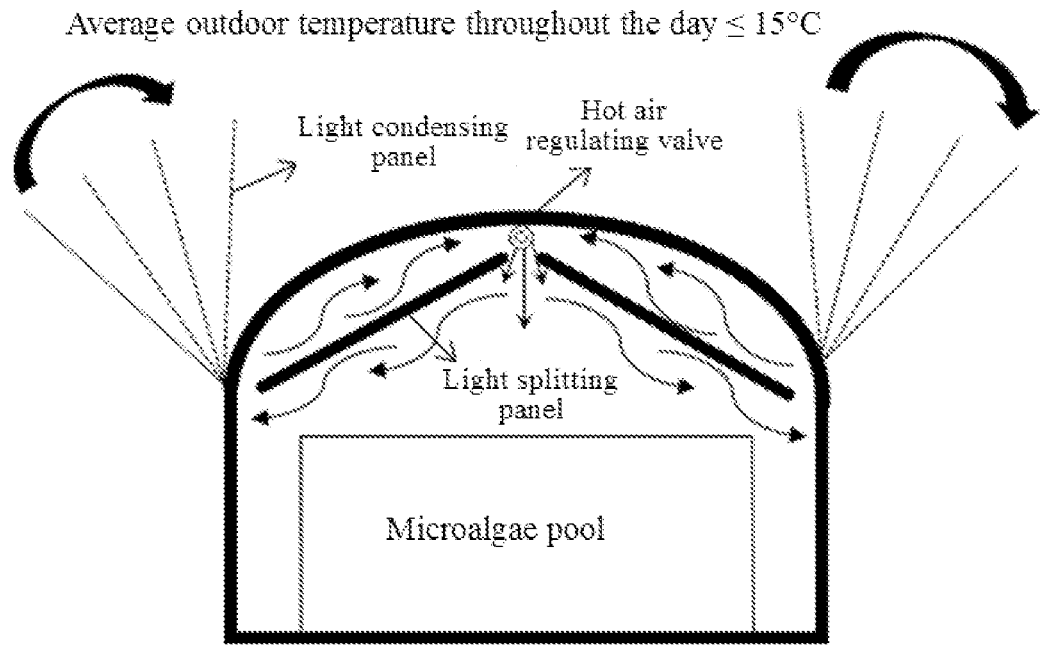
FIG. 1 shows an embodiment of a system for microalgae carbon fixation regulated based on natural environmental changes of the present invention, and shows a working status of the system at a temperature of 0-15° C.

At a temperature of 0-15° C. and an irradiance of 500-800 $MJ/m^2$, the growth rate of spirulina was increased by 1.5 times under the combined action of light condensing and splitting and siphonage, as shown in FIG. 1.

Example 3 Method for Carbon Fixation by Spirulina Suitable for Use in Mild Natural Environmental Conditions A light reflective film with a reflectance of 90% was attached to a surface of a light-condensing reflective panel. An angle between incident sunlight and the light-condensing panel (i.e., the light-condensing reflective panel) was 45°. A length ratio of the light-condensing panel to a microalgae pool was 1:1, and a width ratio of the light-condensing panel to the microalgae pool was 1.1:1. Light splitting panels each adopted a light splitting film made of a glass substrate and a silicon substrate, which was a light splitting film with 27-33 layers of $SiO_2/TiO_2$, with a transmittance of 0.9 for visible light within 300-700 nm, and a reflectivity greater or equal to 0.65 for infrared light within 700-2500 nm. A connecting panel between the light splitting panels was opened. When a temperature of the pool was higher than 17° C., a hot air regulating valve was opened to lead out a hot air source.

At a temperature of 15-25° C. and an irradiance of 500-1000 $MJ/m^2$, the growth rate of spirulina was increased by 1.8 times under the combined action of light condensing and splitting and thermosyphon.

The invention claimed is:

1. A system for microalgae carbon fixation regulated based on natural environmental changes, comprising the following units:
    a microalgae cultivation unit;
    a light condensing unit configured to receive sunlight and increase light power density, the light condensing unit comprising one or more angle-adjustable light-condensing reflective panels;
    a light splitting unit configured to receive and split light transmitted from the light condensing unit, the light splitting unit comprising one or more angle-adjustable light splitting panels and connected by a connecting panel, wherein the light splitting panel is capable of transmitting light within a spectral band in which microalgae has highest photosynthetic efficiency to thus allow the light to irradiate the microalgae cultivation unit, while being capable of reflecting light within other spectral bands; and
    a thermosiphon temperature control unit configured to control a temperature of the microalgae cultivation unit by jointly controlling an opening degree of an air regulating valve above the microalgae cultivation unit and the connecting panel.

2. The system according to claim 1, wherein the light-condensing reflective panel has a reflectance of 55%-90%.

3. The system according to claim 1, wherein the light-condensing reflective panel automatically tracks sunlight and is capable of reflecting the sunlight to a light-transmitting film and focusing the sunlight onto a surface of the light splitting panel.

4. The system according to claim 1, wherein the microalgae cultivation unit is configured as such that when the temperature of the microalgae cultivation unit is lower than 15° C., the air regulating valve is closed, and when the temperature of the microalgae cultivation unit is higher than 25° C., the air regulating valve is opened.

5. The system according to claim 1, wherein the light splitting panel is configured as such that the light splitting panel is capable of splitting an incident light source into visible light within 300-700 nm and infrared light within 700-2500 nm.

6. The system according to claim 5, wherein the light splitting panel is configured as such that the light splitting panel is capable of controlling a transmittance of the light within a wavelength of 300-700 nm to be within a range of 0.85-1, and controlling a reflectance of the light with a wavelength of 700-2500 nm to be within a range of 0.5-1.

7. The system according to claim 1, wherein the light splitting panel is a glass light splitting panel or a light splitting panel with a light splitting film attached thereon.

8. The system according to claim 7, wherein a substrate of the light splitting panel with the light splitting film attached thereon is a Si substrate, and a material of the light splitting film is a multilayer film material containing $SiO_2$ and $TiO_2$.

9. A method for using the system for microalgae carbon fixation regulated based on natural environmental changes according to claim 1, comprising:
  1) Placing microalgae to be cultivated into the microalgae cultivation unit;
  2) Adjusting the light-condensing reflective panel of the light condensing unit such that light is received and condensed by the light-condensing reflective panel and then irradiates the light splitting panel; receiving the light from the light-condensing reflective panel by the light splitting panel, and then splitting the received light by the light splitting panel to obtain visible light within 300-700 nm and infrared light within 700-2500 nm; and enabling the visible light within 300-700 nm to be transmitted through the light splitting panel and irradiate the microalgae cultivation unit, and enabling the infrared light within 700-2500 nm to be reflected back; and
  3) Adjusting the thermosiphon temperature control unit, so that when the temperature of the microalgae cultivation unit is lower than 15° C., the hot air regulating valve is closed, and when the temperature of the microalgae cultivation unit is higher than 25° C., the hot air regulating valve is opened.

10. The method according to claim 9, wherein the thermosiphon temperature control unit adjusts an output of hot air by adjusting the hot air regulating valve depending on the temperature.

11. The method according to claim 10, wherein when the temperature of the microalgae cultivation unit is lower than 15° C., the air regulating valve is closed, and the connecting panel between the light splitting panels is opened, so that hot air flows upward, and thermosiphon causes flowing of the hot air and cold air as well as heat exchange therebetween, by way of which the temperature of the microalgae cultivation unit is increased; and when the temperature of the microalgae cultivation unit is higher than 25° C., the connecting panel between the light splitting panels is closed, and the hot air regulating valve is opened, so that heated hot air is output, and the hot air provides a heat source for drying the microalgae, and the temperature of the microalgae cultivation unit is thus decreased.

* * * * *